US008082341B2

(12) United States Patent
Nix et al.

(10) Patent No.: US 8,082,341 B2
(45) Date of Patent: Dec. 20, 2011

(54) ACTIVEX DETECTION AND HANDLING IN MOZILLA-BASED BROWSERS

(75) Inventors: William D. Nix, Austin, TX (US); Mark K. Anderson, Austin, TX (US); Gary D. Huber, Austin, TX (US); James M. Totton, Kirkland, WA (US)

(73) Assignee: Dell Products L.P., Round Rock, TX (US)

( * ) Notice: Subject to any disclaimer, the term of this patent is extended or adjusted under 35 U.S.C. 154(b) by 987 days.

(21) Appl. No.: 11/394,296

(22) Filed: Mar. 30, 2006

(65) Prior Publication Data

US 2007/0233807 A1    Oct. 4, 2007

(51) Int. Cl.
 *G06F 15/173* (2006.01)
(52) U.S. Cl. ......... 709/224; 709/201; 709/202; 709/203
(58) Field of Classification Search ................... 709/224
 See application file for complete search history.

(56) References Cited

U.S. PATENT DOCUMENTS

| | | | | |
|---|---|---|---|---|
| 5,974,549 | A | 10/1999 | Golan | 713/200 |
| 5,995,756 | A | 11/1999 | Herrmann | 395/712 |
| 6,486,893 | B1 | 11/2002 | Rmchandani et al. | 345/762 |
| 6,535,231 | B1 | 3/2003 | Nix | 345/835 |
| 6,691,176 | B1 | 2/2004 | Narin et al. | 709/318 |
| 6,734,873 | B1 | 5/2004 | Herf et al. | 345/629 |
| 6,941,562 | B2 | 9/2005 | Gao et al. | 719/330 |
| 7,676,762 | B2 * | 3/2010 | Shafron | 715/826 |
| 2002/0107890 | A1 | 8/2002 | Gao et al. | 707/513 |
| 2002/0165827 | A1 | 11/2002 | Gien et al. | 705/64 |
| 2003/0048286 | A1 | 3/2003 | Lal | 345/700 |
| 2005/0108033 | A1 * | 5/2005 | Everett-Church | 705/1 |
| 2006/0253584 | A1 * | 11/2006 | Dixon et al. | 709/225 |

OTHER PUBLICATIONS

Lock, Adam, Mozilla ActiveX Project, http://www.iol.ie/~locka/mozilla/mozilla.htm, Jan. 1, 2006 (as seen on archive.org).*

* cited by examiner

*Primary Examiner* — Dohm Chankong
*Assistant Examiner* — Neeraj Utreja
(74) *Attorney, Agent, or Firm* — Hamilton & Terrile, LLP; Gary W. Hamilton

(57) ABSTRACT

A system and method is disclosed that allows ActiveX functionality to be conditionally invoked by a non-ActiveX-enabled browser, such as those based on Mozilla technology, through the implementation of user-defined controls to mitigate system security vulnerability. ActiveX controls can be identified from within a Mozilla-based browser and the user can be presented with a choice of actions instead of ActiveX controls being automatically downloaded and activated by a browser extension such as E View. By referencing one or more user-definable lists containing domains, URLs, and ActiveX controls along with their respective attributes the method of the invention allows a user to specify the preferred behavior of a non-IE browser when attempting to render Web pages containing ActiveX controls.

18 Claims, 3 Drawing Sheets

ACTIVEX DETECTION AND HANDLING IN MOZILLA-BASED BROWSERS

BACKGROUND OF THE INVENTION

1. Field of the Invention

The present invention relates in general to the field of information handling systems and more specifically, to the display of information on an information handling system using an internet browser.

2. Description of the Related Art

As the value and use of information continues to increase, individuals and businesses seek additional ways to process and store information. One option available to users is information handling systems. An information handling system generally processes, compiles, stores, or communicates information or data for business, personal, or other purposes, thereby allowing users to take advantage of the value of the information. Because technology and information handling needs and requirements vary between different users or applications, information handling systems may also vary regarding what information is processed, stored or communicated, and how quickly and efficiently the information may be processed, stored, or communicated. The variations in information handling systems allow for information handling systems to be general or configured for a specific user or specific use such as financial transaction processing, airline reservation, enterprise data storage, or global communications. In addition, information handling systems may include a variety of hardware and software components that may be configured to process, store, and communicate information, and may include one or more computer systems, data storage systems, and networking systems.

Information handling systems continue to improve in their ability to generate and manage information. Increasingly, this information is accessed and interacted with through a browser application. Currently, one of the most popular browsers is Internet Explorer (IE), produced by Microsoft. IE was originally designed to enable enhanced interactive content delivery to a user while supporting the broadest range of web pages without major problems. However, other browsers, such as those based on Mozilla technology, are now offering technical capabilities and features not currently available with IE.

One of the features of the IE browser is its use of ActiveX, which allows for the creation of applications that can be downloaded and run within the E browser. ActiveX encompasses a set of object-oriented programming tools and resource sharing technologies that are based on Microsoft's Object Linking and Embedding (OLE) and Component Object Model (COM). When a program is written in the ActiveX environment, a self-sufficient component is created that can run anywhere in an ActiveX network environment. This component is known as an ActiveX control, which is roughly equivalent to a Java applet. An advantage of such a component is that it can be reused by many applications, commonly referred to as application containers.

With the use of ActiveX, web pages can extend their functionality by providing direct access to a computer's operating system and application programs, thereby allowing them to be more dynamic and interactive. Since it is tightly integrated with the operating system, IE can facilitate this interaction, as it makes full use of the accessibility framework available within Windows. While advantageous in many regards, the embedding of these capabilities into IE can also create an environment conducive to the spread of malicious programs such as viruses, Trojan horses, and spyware infections. These hostile programs typically use ActiveX to automatically download onto a computer, activate themselves, and then propagate to other computers.

When an ActiveX control is about to be downloaded and run, it presents a digital signature, purportedly from the author of the program, and the user is prompted whether or not to accept the download. The digital signature may be valid and legitimate or it could be a forgery presented by an unscrupulous hacker. The user has two choices: either accept the digital signature at face value and let the program proceed, or reject it completely. ActiveX security relies on the user making the right decision about which digital signatures and/or programs to accept and which ones to reject. Accepting a malicious program that has been disguised or misrepresented can result in unexpected, even catastrophic, results. Furthermore, hackers continue to discover and exploit additional ActiveX vulnerabilities that can allow them to bypass the presentation of digital signatures and then download and install malicious software onto a computer without the user's knowledge.

A possible response in addressing these security issues is to use browsers that do not use ActiveX. One such browser is Firefox, which is based on Mozilla technology and can be configured to automatically download most files, but not ".exe" files, which are executable programs. However, this approach does not fully address the issue of how to safely access the dynamic and interactive capabilities of Web sites that have extended their functionality by implementing ActiveX controls.

One current approach is the IE View extension for Firefox which allows a user to enter a list of domains or URLs which should be viewed in E. When Firefox intercepts one of these URLs, the extension automatically launches IE with the intercepted URL. However, simply launching IE and running downloaded ActiveX controls can still introduce undesirable security issues. What is needed are additional controls to limit security vulnerabilities when ActiveX controls are implemented on a user's computer.

SUMMARY OF THE INVENTION

In accordance with the present invention, a system and method is disclosed that allows ActiveX functionality to be conditionally invoked by a non-ActiveX-enabled browser through the implementation of user-defined controls to mitigate system security vulnerability. It will be apparent to those of skill in the art that that one approach to mitigating ActiveX security issues is to use browsers, such as Firefox, that do not implement ActiveX controls. For example, ActiveX controls can be identified from within Firefox and the user can be presented with a choice of actions instead of ActiveX controls being automatically downloaded and activated by IE View.

In an embodiment of the invention, an extension to Firefox can be implemented that can identify the presence of ActiveX controls within a web site. Each ActiveX control is then identified by its Universally Unique Identifier (UUID), which is captured along with the URL of the page that contains it. In this same embodiment, once an ActiveX control has been identified by its UUID and URL location, it can be compared against one or more lists. For example, a list could contain a user's personal preference list of ActiveX controls, URLs and domains to be opened in IE. Another list could contain a user's personal preference list of ActiveX controls, URLs and domains to be filtered. A third list could be distributed with the Firefox extension, containing a pre-defined (and updatable) "white" list of known good ActiveX controls, URLs and domains coupled with a recommendation that they be opened in IE. Conversely, a fourth list could be distributed with the Firefox extension, containing a pre-defined (and updatable) "black" list of known bad ActiveX controls, URLs and/or domains coupled with a recommendation that they be filtered. In an embodiment of the invention, if a URL or domain containing ActiveX controls is not found on any of the lists described in more detail hereinabove, the user can be presented with a dialog offering different options, such as "filter the ActiveX controls and attempt to render the page without them" or "pass the URL to IE to view the page and install ActiveX controls."

In an embodiment of the invention, the list of ActiveX controls, URLs and/or domains recommended to be opened with IE can be automatically populated. In an embodiment of the invention, the list of ActiveX controls, URLs and/or domains recommended to be opened with IE can be manually populated. In an embodiment of the invention, an override list of ActiveX controls, URLs and/or domains recommended to be opened with IE can be implemented. In an embodiment of the invention, an historical list of ActiveX controls, URLs and/or domains opened with IE can be implemented. In an embodiment of the invention, an option can be presented to the user to perform the chosen action whenever the ActiveX control, URL and/or domain is encountered in the future. Those of skill in the art will realize that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
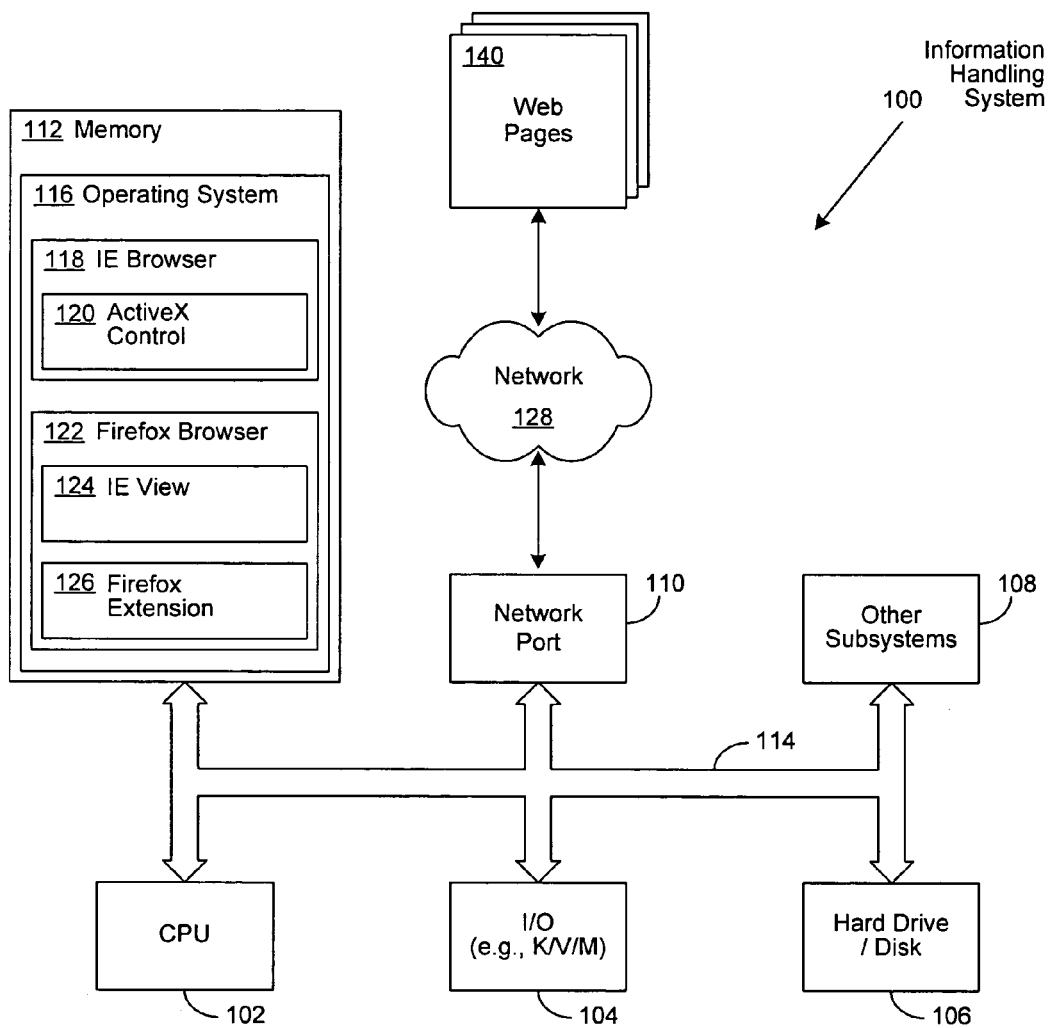
FIG. 1 is a generalized illustration of an information handling system that can be used to implement the method and apparatus of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, various other subsystems 108, network port 110, and system memory 112, all interconnected via one or more buses 114. Operating system 116 resides in system memory 112 and in an embodiment of the invention supports an implementation of Internet Explorer (IE) browser 118 which can be utilized by the present invention for implementation of ActiveX control 120. Operating system 116 further supports an implementation of a non-IE browser, such as Firefox browser 122, which does not support ActiveX controls, but can support implementation of the IE View extension 124 for Firefox browser 122, which in turn can invoke IE to render Web pages containing ActiveX controls. Firefox browser 122 can also support various implementations of the present invention through extension 126, which can provide more control over the implementation of E View extension 124 when it invokes IE to render Web pages containing ActiveX controls.

In an embodiment of the present invention, information handling system 100 communicates through network port 110 to a private (e.g., secured corporate network), public (e.g., the Internet), or hybrid (e.g., a private Intranet implemented on the public Internet) network 128 which can be but is not limited to, a local area network (LAN), a wide area network (WAN), a virtual network (VNET), or any combination of communication technologies and/or protocols that may be required to interact with one or more Web pages 140, which may contain ActiveX controls.

For purposes of this disclosure, an information handling system may include any instrumentality or aggregate of instrumentalities operable to compute, classify, process, transmit, receive, retrieve, originate, store, display, manifest, detect, record, reproduce, handle, or utilize any form of information, intelligence or data for business, scientific, control or other purposes. For example an information handling system may be a personal computer, a network storage device, or any other suitable device and may vary in size, shape performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
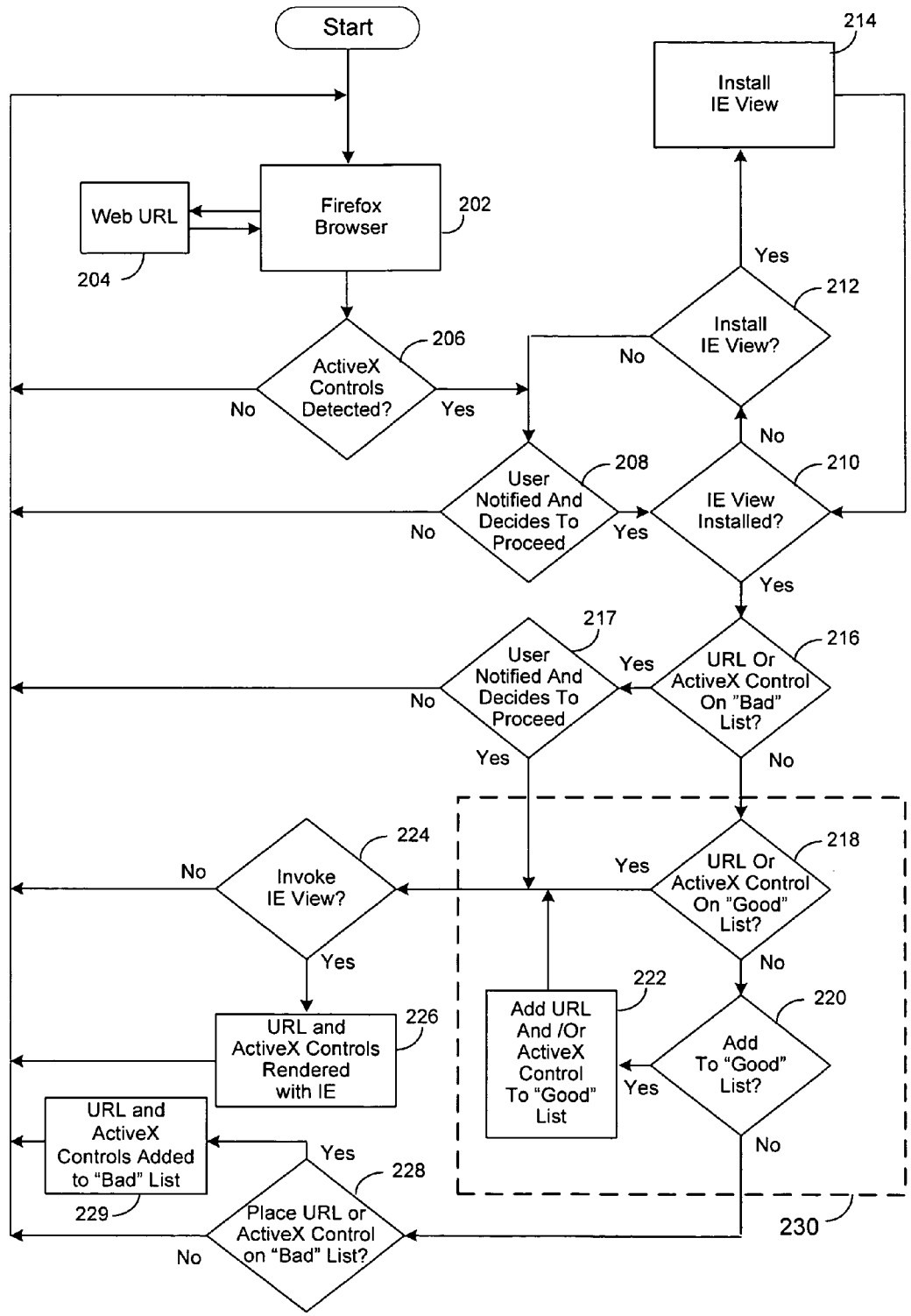
FIG. 2 is a generalized flow chart illustrating one embodiment of the present invention as implemented to render Web pages containing ActiveX controls using a non-IE browser.

FIG. 2 is a generalized flow chart illustrating one embodiment of the present invention as implemented to render Web pages containing ActiveX controls when using a non-IE browser. In step 202, a non-IE browser, such as Firefox, communicates with a Web URL 204. The Web URL 204 returns information to the Firefox browser including, but not limited to, the Universal Unique Identifier (UUID) of any ActiveX controls residing in the URL. Processing then proceeds to step 206 where a test is conducted to determine whether any ActiveX controls have been detected. If the result of the test conducted in step 206 indicates that no ActiveX controls have been detected, processing returns to step 202. If, however, the result of the test conducted in step 206 indicates that ActiveX controls have been detected, processing proceeds to step 208 where the user is notified that the Web URL contains ActiveX controls and the user decides whether to proceed and render the URL containing ActiveX controls using IE. If the user decides not to proceed, processing returns to step 202 and the Firefox browser continues to monitor URLs for the presence of ActiveX controls. If, however, the result of step 208 is a decision to proceed, processing proceeds to step 210 where a test is conducted to determine whether IE View is installed and active on the user's computer. If the result of the test conducted in step 210 indicates that IE View is not installed, processing proceeds to step 212 where the user is prompted to make a decision whether to install WE View. If the result of step 212 is a decision not to install IE View, processing returns to step 208. If, however, step 212 results in a decision to install E View, processing proceeds to step 214 where IE View is installed.

Returning to step 210, it the result of the test conducted in that step indicates that IE View is installed, processing proceeds to step 216 where a test is conducted to determine whether the URL or the ActiveX control is on a "bad" list. If the result of the test conducted in step 216 indicates that the URL or the ActiveX control is on a "bad" list, processing proceeds to step 217 where the user is notified and prompted for a decision whether to proceed. If the user elects to proceed, processing proceeds to step 224 where the user is prompted for a decision regarding whether to invoke IE. If the user decides not to invoke IE, processing returns to step 202. If, however, the user decides to invoke IE view, processing proceeds to step 226 where the URL or ActiveX controls are rendered using Internet Explorer. If the result of the test conducted in step 216 indicates that the URL or ActiveX control is not on a "bad" list, processing proceeds to step 218 where a test is conducted to determine whether the URL or ActiveX control is on a "good" list. As will be discussed in greater detail hereinbelow, the possible "good" lists include: 1) a "whitelist" of known good or "trusted" URLs and ActiveX controls; 2) a user-defined personal preference list of URLs and ActiveX controls; and 3) a user-defined filter list of URLs and ActiveX controls.

If the result of the test conducted in step 218 indicates that the URL or the ActiveX control is on a "good" list, processing proceeds to step 224 followed by step 226, as discussed hereinabove. If, however, the result of the test conducted in step 218 indicates that the URL or ActiveX control is not on a "good" list, processing proceeds to step 220 where the user is prompted to make a decision whether to add the URL or ActiveX control to a "good" list. If the decision made in step 220 is to add the URL to a "good" list, processing proceeds to step 222 where the URL and/or ActiveX control is added to a "good" list. Processing then proceeds to steps 224-226 as discussed above. If the result of step 220 is a decision not to add the URL or ActiveX control to the "good" list, processing proceeds to step 228 where the user is prompted for a decision regarding whether to add the URL or ActiveX control to the "bad" list. If the result of step 228 is to add the URL or ActiveX control to the "bad" list, processing proceeds to step 229; otherwise, processing returns to step 202.

In an embodiment of the invention Java Script can be implemented to detect the presence of ActiveX controls within a domain or URL (step 206) and the presence of IE View on system (step 210). The follow is an example of a Java Script that can be used to accomplish the aforementioned steps:

```
<head>
<script language="JavaScript" type="text/javascript">
<!-
if (window.ActiveXObject || IEView.installed) {
    // Do Active X things in IE and populate IEView
}
else if (window.ActiveXObject)
{
    // Do Active X things only in IE, and not populate IEView} else {
    // Don't do Acive X things
}
//-->
</script>
</head>
```

In this embodiment of the invention, the Java Script presumes that a browser that is not ActiveX-enabled has contacted a Web URL, data has been returned, ActiveX controls can be detected within the URL data, and the user can be queried to allow ActiveX controls to implemented to render the URL. If IE View is installed, the user can be prompted to invoke IE as described above. If the user responds affirmatively, the IE View URL database can populated, IE can be invoked, and the URL can be rendered with ActiveX controls. Alternatively, if E View has not been installed, the user can be prompted to manually invoke IE to render the URL with ActiveX controls, or to not invoke E and not render the URL with ActiveX controls.

Figure 3:
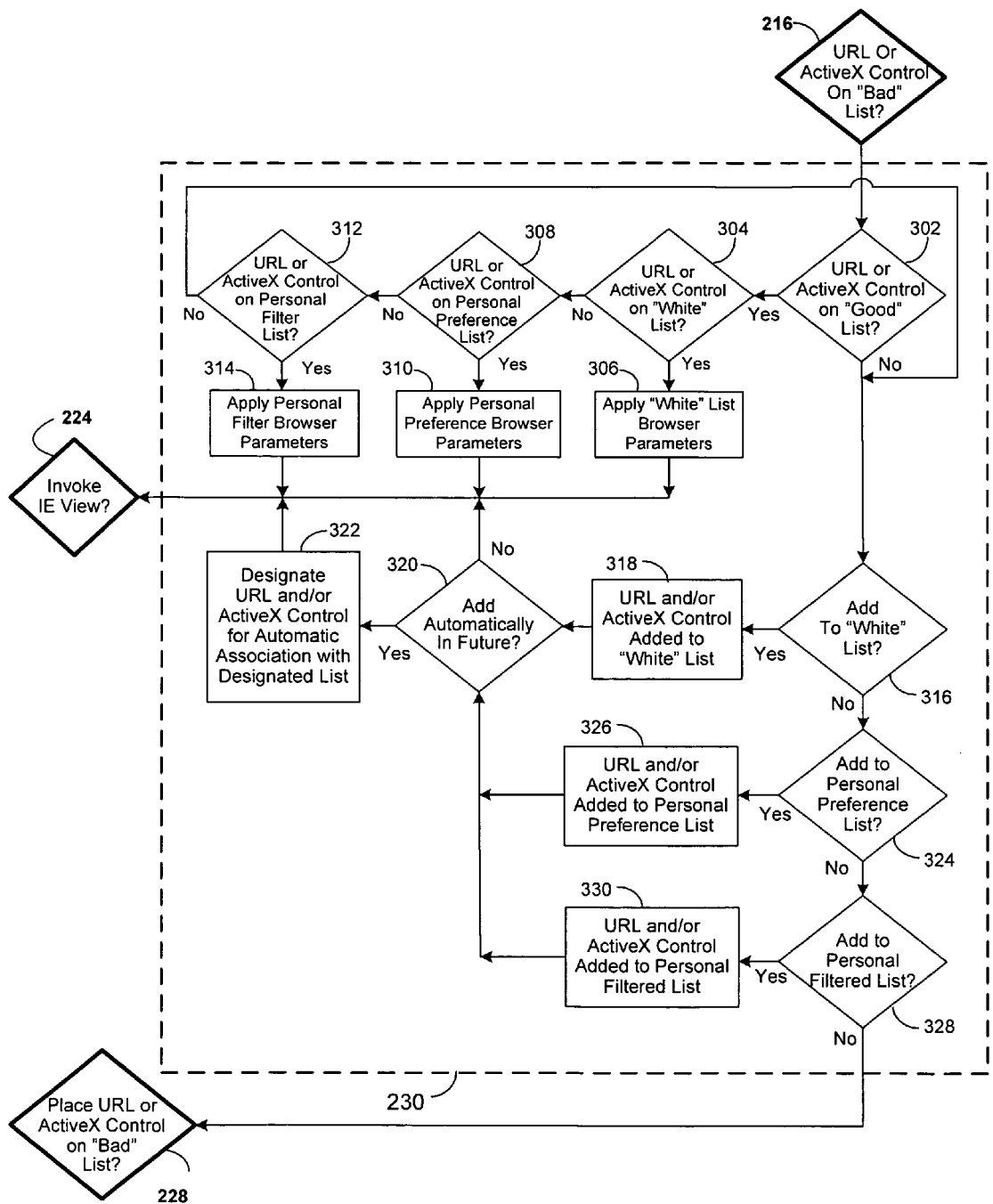
FIG. 3 is a generalized flow chart illustrating one embodiment of the present invention as implemented to manage lists of ActiveX controls, URLs and domains that can be referenced by a non-IE browser when attempting to render Web pages containing ActiveX controls.

FIG. 3 is a flow chart illustration of an embodiment of the present invention for implementing multiple options for the management of lists of ActiveX controls, URLs, and domains that can be referenced by a non-IE browser when attempting to render Web pages containing ActiveX controls. In step 302, a test is conducted to determine whether the URL or ActiveX control is on a "good" list. If the result of the test conducted in step 302 indicates that the URL or ActiveX control is on a "good" list, processing proceeds to step 304 where a test is conducted to determine whether the URL or ActiveX control is on a "White" list. If the result of the test conducted in step 304 indicates that the URL or ActiveX control is on a "White" list, processing proceeds to step 306 where the "White" list browser parameters are applied. If, however, the result of the test conducted in step 304 indicates that the URL or ActiveX control is not on a "White" list, processing proceeds to step 308 where a test is conducted to determine whether the URL or ActiveX control is on a Personal Preference List. If the result of the test conducted in step 308 indicates that the URL or ActiveX control is on a Personal Preference List, processing proceeds to step 310 where the Personal Preference browser parameters are applied to the URL or ActiveX control. If, however, the result of the test conducted in step 308 indicates that the URL or ActiveX control is not on a Personal Preference List, processing proceeds to step 312 where a test is conducted to determine whether the URL or ActiveX control is on a personal filter list. If the result of the test conducted in step 312 indicates that the URL or ActiveX control is on a personal filter list, processing proceeds to step 314 where the personal filter browser parameters are applied to the URL or ActiveX control.

Returning to step 302, if the result of that processing step indicates that the URL or ActiveX control is not on a "good" list, processing proceeds to step 316 where the user is prompted regarding a decision whether to add the URL or ActiveX control to a "White" list. If the result of step 316 is a decision to add the URL or ActiveX control to a "White" list, processing proceeds to step 318 where the "White" list is updated to include the URL or ActiveX control. Processing then proceeds to step 320 where the user is prompted regarding a decision whether to automatically add the designated URL or ActiveX controls to the "White" list in the future. If the result of step 320 is a decision to add the URLs or ActiveX controls automatically, processing proceeds to step 322 where the designated URLs or ActiveX controls are automatically associated with the appropriate designated list, e.g., the "White" list. Processing then proceeds to step 224 as discussed hereinabove in connection with FIG. 2.

If the result of step 316 is not to add the URL or ActiveX control to the "White" list, processing proceeds to step 324 where the user is prompted for a decision whether to add the URL or ActiveX control to a Personal Preference List. If the result of step 324 is a decision to add the URL or ActiveX control to a Personal Preference List, processing proceeds to step 326 followed by steps 320-322 as discussed hereinabove. If, however, the result of step 324 is a decision not to add the URL or ActiveX control to a Personal Preference List, processing proceeds to step 328 where the user is prompted for a decision whether to add the URL or ActiveX control to a personal filter list. If the result of step 328 is a decision to add the URL or ActiveX control to the personal filter list, processing proceeds to step 330, followed by steps 320-322 as discussed above. If, however, the result of step 328 is a decision not to add the URL or ActiveX control to a personal filter list, processing proceeds to step 228 where a decision is made whether to place the URL or ActiveX control on a "bad" list, as discussed above in connection with FIG. 2.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A method for managing the display of information on an information handling system, comprising:
   initiating a first internet browser operable to access an internet URL, said first internet browser not operable to render an ActiveX control;
   using said first internet browser to obtain a set of data parameters associated with said internet URL;
   analyzing said data parameters to identify predetermined display control parameters associated with said internet URL, said predetermined display control parameters corresponding to said ActiveX control;
   generating a request to display video data associated with said Internet URL in a second internet browser operable to render said ActiveX control, said request displayed within said first internet browser; and
   conditionally executing said second internet browser to display said video data, wherein said conditional execution is initiated in response to receipt of user input data within said first internet browser authorizing said display of video data, wherein said display of video data is based upon rendering of said ActiveX control within said second internet browser.

2. The method of claim 1, wherein said video data comprises universally unique identifiers (UUIDs) associated with said predetermined display control parameters for displaying video data.

3. The method of claim 2, wherein said second internet browser comprises an Internet Explorer View (IEView) application.

4. The method according to claim 3, further comprising generating a plurality of classification lists of URLs wherein video data associated with URLs on said preference lists is classified for display using said first and second internet browser.

5. The method according to claim 4, wherein said plurality of classification lists are generated automatically based on information correlated with said UUIDs.

6. The method of claim 4, wherein said plurality of classification lists comprises a list of known good UUIDs wherein said second internet browser is executed and wherein video data is displayed using IEView and said ActiveX controls.

7. The method of claim 4, wherein said plurality of classification lists comprises a user-defined preference list of URLs wherein said second internet browser is executed and wherein video data is displayed using IE view and said ActiveX controls.

8. The method of claim 4, wherein said plurality of classification lists comprises a user-defined filtered list of URLs, wherein said second internet browser is not executed and wherein video data is displayed using said first internet browser.

9. The method of claim 4, wherein said plurality of classification lists comprises a list of known bad applications, wherein said second internet browser is not executed and wherein video data is displayed using said first internet browser.

10. An information handling system operable to manage the display of visual information received from an internet web page, comprising:
    storage media having executable code stored thereon, said executable code comprising a first internet browser and a second internet browser to access an internet URL, said first internet browser not operable to render an ActiveX control and said second internet browser operable to render an ActiveX control;
    a processor operable to execute said code, said processor further operable to:
        use said first internet browser to obtain a set of data parameters associated with said internet URL;
        analyze said data parameters to identify predetermined display control parameters associated with said internet URL, said predetermined display control parameters corrsponding to said ActiveX control;
        generate a request to display video data associated with said Internet URL in a said second internet browser, said request displayed within said first internet browser; and
        conditionally execute said second internet browser to display said video data, wherein said conditional execution is initiated in response to receipt of user input data within said first internet browser authorizing said display of video data, wherein said display of video data is based upon rendering of said ActiveX control within said second internet browser.

11. The information handling system of claim 10, wherein said video data comprises universally unique identifiers (UUIDs) associated with said predetermined display control parameters for displaying video data.

12. The information handling system of claim 11, wherein said second internet browser comprises an Internet Explorer View (IEView) application.

13. The information handling system according to claim 12, further comprising generating a plurality of classification lists of URLs wherein video data associated with URLs on said preference lists is classified for display using said first and second internet browser.

14. The information handling system according to claim 13, wherein said plurality of classification lists are generated automatically based on information correlated with said UUIDs.

15. The information handling system of claim 13, wherein said plurality of classification lists comprises a list of known good UUIDs wherein said second internet browser is executed and wherein video data is displayed using IEView and said ActiveX controls.

16. The information handling system of claim 13, wherein said plurality of classification lists comprises a user-defined preference list of URLs wherein said second internet browser is executed and wherein video data is displayed using IE view and said ActiveX controls.

17. The information handling system of claim 13, wherein said plurality of classification lists comprises a user-defined filtered list of URLs, wherein said second internet browser is not executed and wherein video data is displayed using said first internet browser.

18. The information handling system of claim 13, wherein said plurality of classification lists comprises a list of known bad applications, wherein said second internet browser is not executed and wherein video data is displayed using said first internet browser.

* * * * *